(12) United States Patent
Ono et al.

(10) Patent No.: US 6,990,048 B2
(45) Date of Patent: Jan. 24, 2006

(54) TRACK JUMP CONTROL APPARATUS AND TRACK JUMP METHOD

(75) Inventors: Takayuki Ono, Osaka (JP); Yasunori Kuwayama, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 728 days.

(21) Appl. No.: 10/090,744

(22) Filed: Mar. 6, 2002

(65) Prior Publication Data

US 2002/0126590 A1   Sep. 12, 2002

(30) Foreign Application Priority Data

Mar. 6, 2001   (JP)   ............... 2001-061530

(51) Int. Cl.
   *G11B 7/085*   (2006.01)
(52) U.S. Cl. ............... 369/44.28; 369/30.17; 369/30.16; 369/30.24; 369/44.32
(58) Field of Classification Search ............ 369/44.28, 369/30.17, 30.13, 30.14, 30.16
   See application file for complete search history.

(56) References Cited

U.S. PATENT DOCUMENTS

| | | | | |
|---|---|---|---|---|
| 4,817,069 A | * | 3/1989 | Shigemori | 369/44.28 |
| 4,819,219 A | * | 4/1989 | Nagano | 369/30.16 |
| 5,408,454 A | * | 4/1995 | Hasegawa | 369/44.25 |
| 6,628,580 B1 | * | 9/2003 | Kishimoto et al. | 369/44.28 |
| 6,721,239 B2 | * | 4/2004 | Kishimoto et al. | 369/30.17 |
| 6,762,981 B2 | * | 7/2004 | Ono | 369/44.28 |

FOREIGN PATENT DOCUMENTS

| | | |
|---|---|---|
| JP | 63-048685 | 3/1988 |
| JP | 63-276714 | 11/1988 |
| JP | 01-150284 | 6/1989 |
| JP | 05-028514 | 2/1993 |
| JP | 07-048257 | 2/1995 |
| JP | 09-102135 | 4/1997 |
| JP | 10-255280 | 9/1998 |
| JP | 11-088299 | 3/1999 |
| JP | 11-259959 | 9/1999 |
| JP | 2000-090444 | 3/2000 |
| JP | 2002-245642 | 8/2002 |

* cited by examiner

*Primary Examiner*—David Hudspeth
*Assistant Examiner*—Adam R. Giesy
(74) *Attorney, Agent, or Firm*—Crowell & Moring LLP

(57) ABSTRACT

A disk apparatus includes a DSP (digital signal processor), and the DSP controls respective circuit components under instructions of a MCU. During a track jump, a DSP core detects a zero-cross cycle of a TE (Tracking Error) signal just before. If a detected zero-cross cycle is delayed than a target value, the DPS core applies an acceleration pulse of a first predetermined level to a driver, and if the zero-cross cycle is faster than the target value, the DPS core applies a deceleration pulse of a second predetermined level to the driver, whereby an objective lens can be controlled to move at approximately constant speed between adjacent tracks. However, if the zero-cross cycle is considerably delayed than the target value, the DSP core forestalls a reverse rotation of a moving direction of the objective lens against the disk by greatly accelerating the objective lens. Therefore, the number of tracks to have been jumped is not to be counted erroneously.

8 Claims, 10 Drawing Sheets

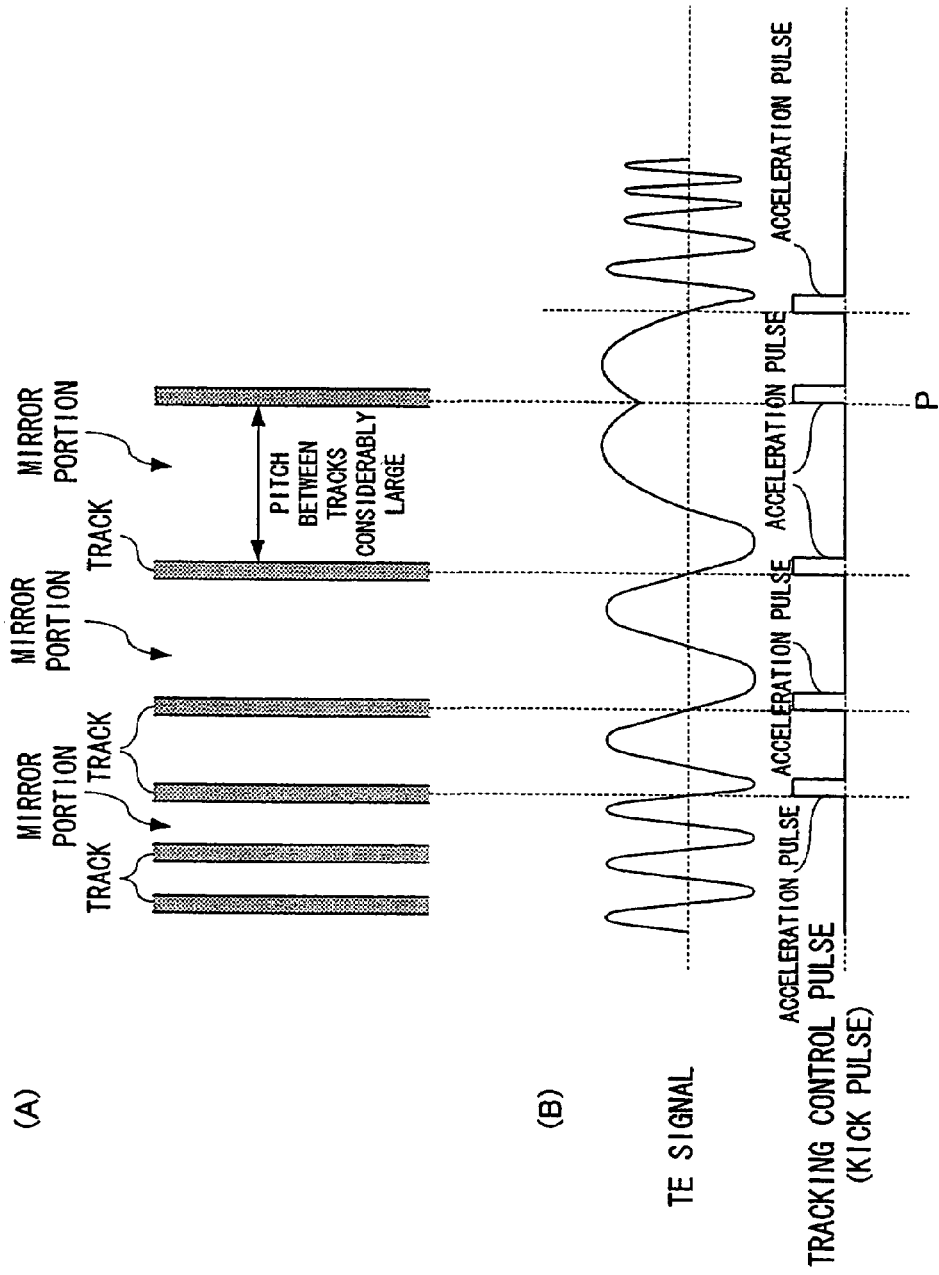

TRACK JUMP CONTROL APPARATUS AND TRACK JUMP METHOD

BACKGROUND OF THE INVENTION

1. Field of the Invention

The present invention relates to a track jump control apparatus and a track jump method. More specifically, the present invention relates to a track jump control apparatus and a track jump method, in which a target track number is set, a jump pulse corresponding to the target track number is applied to a tracking actuator driver, and a jump is performed one by one track by applying a first acceleration pulse or a deceleration pulse at a suitable timing to the tracking actuator driver until the target track number is reached, for example.

2. Description of the Prior Art

One example of such a kind of a track jump apparatus is disclosed in, for example, Japanese Patent Publication No. 7-48257 [G11B 7/085, G11B 21/08] published on May 24, 1995. In a multi-track jump circuit of this optical disk apparatus, as in a case of a DVD player "DVD-F2000" manufactured/marketed by the assignee of the present invention, each zero-cross interval time of a tracking error signal is measured, and if the measured time is delayed than a target time, an acceleration pulse is applied to a track access mechanism. In contrast, if the measured time is faster, a deceleration pulse is applied to the track access mechanism, whereby a moving speed of a beam is controlled at a constant speed while being jumped so that a track-jump is stably carried out.

However, in this prior art, since each of the acceleration pulse and the deceleration pulse is set at a constant width and a height (level), in a case that a moving speed of a disk becomes considerably faster than that of a beam (pick-up) due to a disturbance such as a vibration of a player main body, an eccentricity of the disk, etc., a moving direction of a pick-up, i.e. the objective lens against the disk becomes reversed (inverted). That is, as shown in FIG. 10(A), in a place where a pitch between adjacent tracks is considerably large due to an eccentricity of the disk, a zero-cross cycle of a tracking error (TE) signal becomes large as understood in FIG. 10(B). Therefore, where outputting an acceleration pulse having a constant width and a height, an acceleration is not sufficient, and therefore, the objective lens cannot catch up with the disk, thus resulting in an inverted moving direction of the pick-up (objective lens) with respect to the disk at a point indicated by P in FIG. 10(B). Therefore, there was a problem that the number of the tracks to jump is erroneously counted, and thus it is not possible to appropriately track-on to a desired (target) track.

SUMMARY OF THE INVENTION

Therefore, it is a primary object to provide a track jump control apparatus of in a disk apparatus and a track jump method capable of appropriately track-jumping in spite of a disturbance during a jumping.

The present invention is a track jump control apparatus in which a target track number is set and a jump pulse corresponding to the target tack number is applied to a tracking actuator driver, and a jump is performed one by one tack by applying a first acceleration pulse or a deceleration pulse at a suitable timing to the tracking actuator driver until the target track number is reached, characterized in that a second acceleration pulse having at least one of a level and a width bigger than that of a first acceleration pulse is applied to the tracking actuator driver when a zero-cross cycle of an immediately preceding tracking error signal exceeds a predetermined threshold value.

In one aspect, the present invention is a track jump control apparatus comprises: a tracking actuator driver for driving a pick-up in a track traversing direction at a time of track-jumping; a first pulse applying means for applying a first acceleration pulse or a deceleration pulse at a suitable timing to the tracking actuator driver; a determining means for determining whether or not a zero-cross cycle of an immediately preceding tracking error signal exceeds a predetermined threshold value until the target track number is reached; and a second pulse applying means for applying a second acceleration pulse bigger than the first acceleration pulse when it is determined by the determining means that the predetermined threshold value is exceeded.

The present invention is a track jump method in a track jump control apparatus in which a target track number is set and a jump pulse corresponding to the target tack number is applied to a tracking actuator driver, and a jump is performed one by one tack by applying a first acceleration pulse or a deceleration pulse at a suitable timing to the tracking actuator driver until the target track number is reached, comprises following steps of: (a) determining whether or not a zero-cross cycle of an immediately preceding tracking error signal exceeds a predetermined threshold value until the target track number is reached; and (b) applying a second acceleration pulse bigger than the first acceleration pulse when the zero-cross cycle exceeds the predetermined threshold value.

In the track jump control apparatus, when a seeking instruction such as a fast-forwarding, a rewinding, a music selection, and a music skipping, and etc. During a reproduction of a disk such as a DVD, a CD, and etc., is given, the total number of tracks to be jumped (target track number) on the basis of a present position and a target position is calculated. A kick pulse (jump pulse) corresponding to the target track number is applied to the tracking actuator driver, and a drive voltage corresponding to the jump pulse is applied to a tracking actuator coil. Therefore, a pick-up, that is, an objective lens starts to move in a direction traversing the track (toward an inner periphery or an outer periphery of the disk), and the track jump is started. During the jumping, the number of the tracks to have been jumped is counted at every time that the pick-up traverses one track, and in addition, a zero-cross cycle of a tracking signal is detected. If the zero-cross cycle has a slight deviation with respect to a target value (target cycle), the first acceleration pulse or the deceleration pulse is applied at a suitable timing to the tracking actuator driver so as to accelerate or decelerate the objective lens in a jumping direction. That is, if slightly slower than the target value, the first acceleration pulse is applied, and in contrast, if slightly faster than the target value, the deceleration pulse is applied. However, in a case that a pitch between adjacent tracks are considerably large and the zero-cross cycle exceeds a predetermined threshold value due to an eccentricity of the disk, a second acceleration pulse bigger than the first acceleration pulse is applied on the assumption that a moving direction of the objective lens against the disk is beginning to invert. More specifically, until the pick-up, that is, the objective lens reaches the target track number, the zero-cross cycle of the immediately preceding tracking error signal is detected, and it is determined whether or not the detected zero-cross cycle exceeds the predetermined threshold value with respect to the target value. Then, if the zero-cross cycle exceeds the predetermined threshold value, the second acceleration pulse is to be applied. The second acceleration pulse is set in such a manner that at least one of a level and a width thereof is bigger than that of the first acceleration pulse, and therefore, it is possible to sufficiently accelerate the objective lens even if the pitch between adjacent tracks is considerably large. Therefore, it is possible to forestall an inversion of the moving direction.

According to the present invention, the moving direction of the pick-up against the disk is previously prevented from being inverted by greatly accelerating the objective lens when the zero-cross cycle of the tracking error signal exceeds the predetermined threshold value during the jumping, and accordingly, the tracks to have been jumped is not to be erroneously counted. Therefore, it is possible to exactly track-on to the target track.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a waveform chart showing the TE signal and the tracking control pulse during a jumping in a case of the track-jumping using a conventional disk apparatus.

DETAILED DESCRIPTION OF THE PREFERRED EMBODIMENTS

Figure 1:
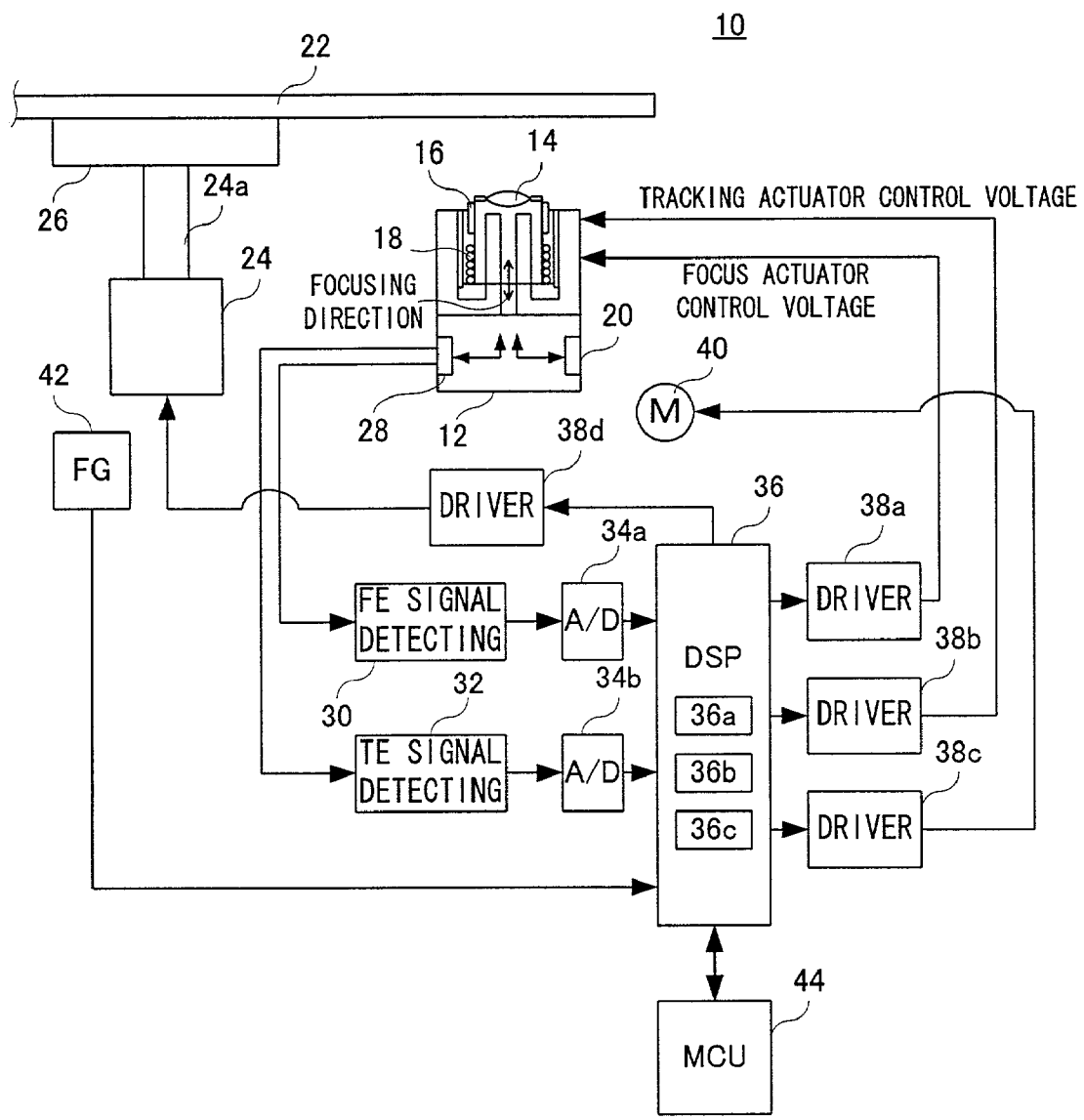
FIG. 1 is an illustrative view showing structure of one embodiment of the present invention.

Referring to FIG. 1, a disk apparatus 10 of this embodiment is capable of reproducing an optical disk (hereinafter briefly referred to as a "disk") such as a DVD, CD, and etc. and includes a pick-up 12. The pick-up 12 is provided with an objective lens 14. The objective lens 14 is a lens of a two-focal-point lens system, for example, and supported by a tracking actuator 16 and a focus actuator 18. In addition, the pick-up 12 includes a laser diode (LD) 20, and a laser beam output from the LD 20 is converged by the objective lens 14 and incident on a recording surface of a disk 22.

More specifically, if the disk 22 is a DVD, a transmitted light (zero-order light) which transmitted the objective lens 14 is incident on a recording surface of the DVD, and if the disk 22 is a CD, a diffraction light (primary-order light) which diffracted the objective lens 14 is incident on a recording surface of the CD. Therefore, a signal recorded on the disk 22 is read (reproduced).

Furthermore, the disk 22 is attached to a turntable 26 fixedly provided on a rotation shaft 24a of a spindle motor 24, and rotated according to a rotation of the spindle motor 24. In this embodiment, the disk 22 is a disk in a CLV (constant linear velocity) system, and the number of rotations of the disk 22 (spindle motor 24) is decreased in relation to a movement of the pick-up 12 from an inner periphery to an outer periphery of the disk 22.

A reflection light from the recording surface passes the aforementioned objective lens 14, and is incident on a light detector 28. An output of the light detector 28 is input to a focus error (FE) signal detecting circuit 30 and a tracking error (TE) signal detecting circuit 32.

An FE signal is detected in the FE signal detecting circuit 30, and an TE signal is detected in the TE signal detecting circuit 32. The TE signal and the TE signal are input to a DSP 36 via an A/D converter 34a and an A/D converter 34b, respectively.

The DSP 36 controls respective circuit components under an instruction of a microcomputer unit (MCU) 44 which functions as a system control microcomputer, and carries out a focus servo process on the basis of the FE signal, and carries out a tracking servo process on the basis of the TE signal, for example.

More specifically, a pulse (focus control pulse) to control the focus actuator 18 is generated by the focus servo process, and the focus control pulse is converted into a focus actuator control voltage in a focus actuator driver 38a (hereinafter briefly referred to as a "driver"), and applied to the focus actuator 18.

In addition, a pulse (tracking control pulse) to control the tracking actuator 16 is produced by the tracking servo process, and the tracking control pulse is converted into a tracking actuator control voltage in a tracking actuator driver 38b (hereinafter briefly referred to as a "driver"), and applied to the tracking actuator 16.

That is, a movement (position) of the objective lens 14 in an optical axis direction (focusing direction) is controlled by the focus actuator control voltage, and a movement (position) of the objective lens 14 in a radius direction (radius direction of the disk 22) is controlled by the tracking actuator control voltage.

Furthermore, a pulse (thread control pulse) to drive a thread motor 40 is generated by a thread servo process, and the thread control pulse is converted into a thread control voltage in a thread driver (driver) 38c which is then applied to the thread motor 40. In addition, the thread control pulse is a PWM signal, and a rotation velocity and a rotation direction of the thread motor 40 is controlled by the PWM signal, and the pick-up 12 coupled to a rotation shaft (not shown) of the thread motor 40 through a rack and pinion system or a ball screw mechanism is caused to move in a radius direction (radial direction) of the disk 22.

Still furthermore, a pulse (rotation control pulse) to rotate the spindle motor 24 is generated by a rotation servo process, and the rotation control pulse is converted into a rotation control voltage a the spindle driver (driver) 38d, and applied to the spindle motor 24. The rotation control pulse is also a PWM signal, and a rotation velocity of the spindle motor 24 is controlled by the PWM signal.

In addition, in a vicinity of the spindle motor 24, there is provided a frequency tacho-generator (FG) 42 which generates a pulse (FG pulse) related to the number of rotation of the spindle motor 24. The FG pulse generated by the FG 42 is input to the DSP 36. Therefore, the DSP 36 detects the number of rotation of the spindle motor 24 on the basis of the FG pulse from the FG 42 after the spindle motor 24 starts (starts-up) to rotate, and applies the detected rotation number to the MCU 44, and generates a rotation control pulse in order for the spindle motor 24 to rotate at a desired rotation number. Therefore, it is possible to appropriately rotate the disk 22 of the CLV system.

If a user inputs a seeking instruction such as a fast-forwarding, a rewinding, a music selection, music skipping (skip), and etc. by using an operation panel (not shown) provided on an apparatus main body or a remocon (not shown), for example, and the seeking instruction is applied to the MCU 44. In response to the seeking instruction, the MCU 44 calculates a target track number, that is, a total number of tracks 22a to jump (total number of tracks) on the basis of a current position and a target position, thereby to instruct the DSP 36 to jump, and also to apply the calculated total number of tracks to the DSP 36.

In response thereto, a DSP core 36a starts a track-jump processing, and firstly, stores the total number of tracks in a memory 36b provided with the DSP 36. Next, the DSP 36a turns off (disables) the tracking servo, and generates the tracking control pulse (kick pulse), that is, a jump pulse corresponding to the total number of tracks saved in the memory 36b, and applies the same to the driver 38b. Therefore, the tracking actuator control voltage in respect to the jump pulse is applied from the driver 38b to the tracking actuator 16. Then, the objective lens 14 starts to move to a direction in which to traverse a track 22a, that is, from the inner periphery (or outer periphery) to the outer periphery (or inner periphery) of the disk 22.

Figure 2:
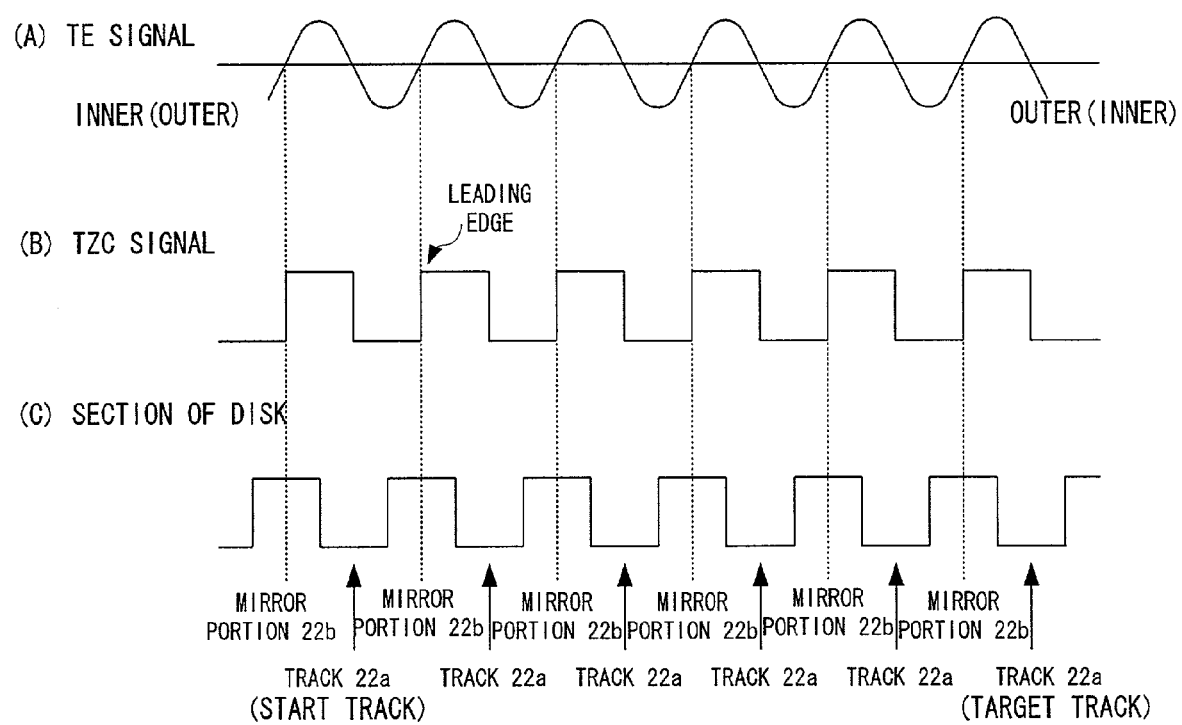
FIG. 2 is an illustrative view showing a TE signal detected in a TE signal detecting circuit shown in FIG. 1 embodiment, a TZC signal produced on the basis of the TE signal, and a disk cross-section in relation to the TE signal and the TZC signal.

While the objective lens 14 is being moving, that is, being jumping, the TE signal as shown in FIG. 2(A) is detected in the TE signal detecting circuit 30. In addition, the TE signal is binalized at a predetermined threshold value by the DSP core 36a, and a tracking zero-cross (TZC) signal shown in FIG. 2(B) is generated. In addition, a sectional view of the disk 22 corresponding to such the TE signal and the TZC signal is illustrated in FIG. 2(C).

Note that on the disk 22, tracks 22a (lands) formed with pits thereon and mirror portions 22b (grooves) which entirely reflect a laser beam are formed.

In addition, the DSP core 36a counts the number of tracks 22a (the number of tracks) to have jumped by a counter 36c provided in the same DSP 36. More specifically, when the DSP core 36a detects a leading edge of the TZC signal shown in FIG. 2(B), the DSP core 36a increments the counter 36c so as to count the number of the tracks. In this manner, a timing of outputting a kick pulse (break pulse) to put a break is controlled by counting the number of tracks 22a to have jumped.

Herein, such the aforementioned tracking actuator control voltage, that is, the jump pulse is set in such a manner that the objective lens 14 moves (jumps) between adjacent tracks 22a at a constant interval (100 $\mu$sec). Therefore, in a case that the adjacent tracks 22a are arranged at a predetermined pitch (DVD is 0.8 $\mu$m, and CD is 1.6 $\mu$m) as shown in FIG. 3(A), the objective lens 14 moves between the adjacent tracks 22a at approximately constant time interval.

Figure 3:
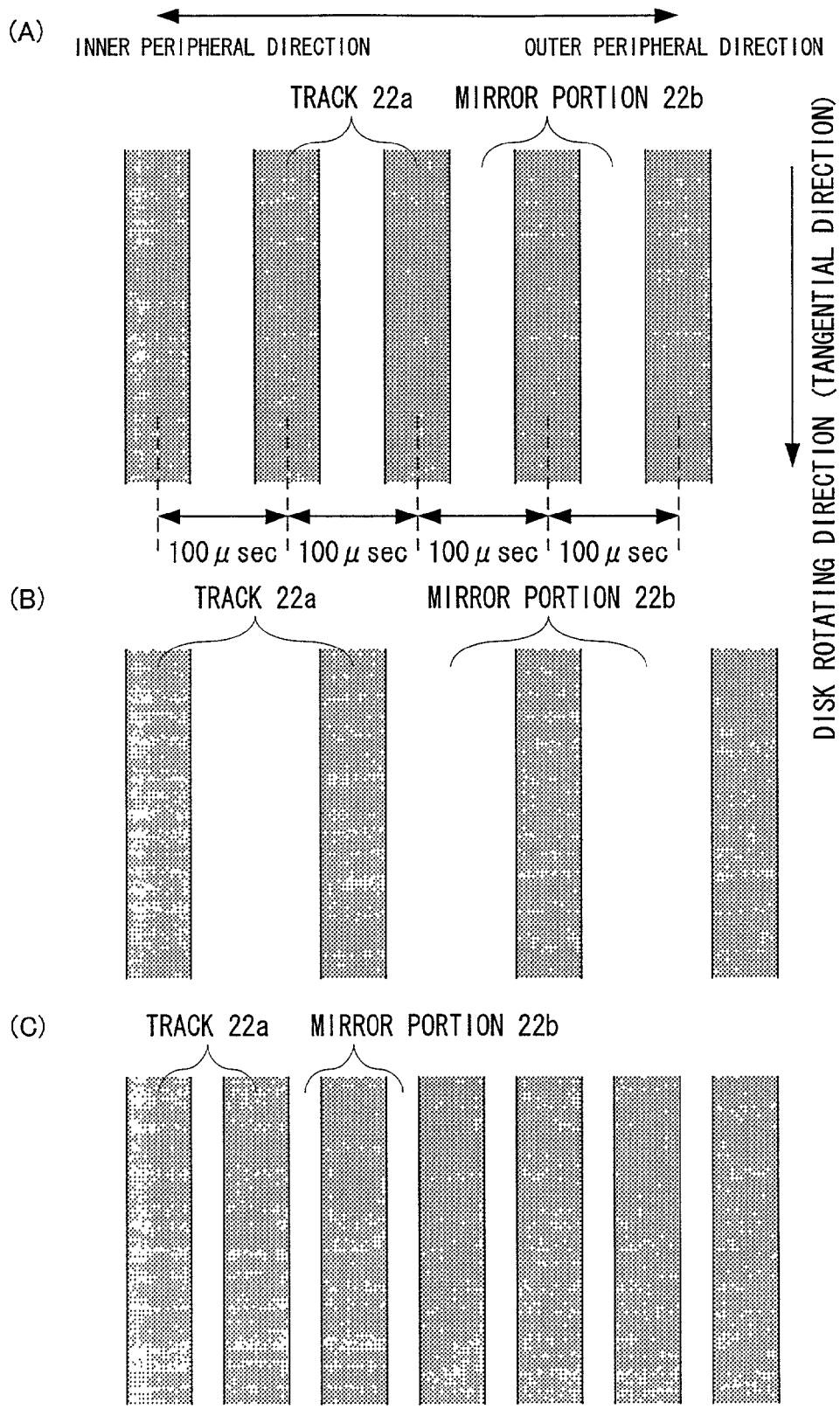
FIG. 3 is an illustrative view showing one example of a portion of a disk shown in FIG. 1 embodiment.

However, as shown in FIG. 3(B) and FIG. 3(C), in a case that the pitch (track pitch) between the adjacent tracks 22a becomes sparse or dense due to an eccentricity of the disk 22 or a disturbance such as a vibration to the apparatus main body, the objective lens 14 is controlled (corrected) to move between the tracks 22a at a constant time interval by applying a kick pulse to control a moving speed of the objective lens 14 to the driver 38b.

Note that density and scarcity of the track pitch is exaggerated in order to be easily understood in FIG. 3(B) and FIG. 3(C); however, in this embodiment, if the track pitch deviates in a range of ±5%, the moving speed of the objective lens 14 is controlled.

More specifically, if the track pitch is sparse as shown in FIG. 3(B), the moving speed of the objective lens 14 becomes slow, and therefore, the kick pulse (acceleration pulse) of a first predetermined level to slightly accelerate the objective lens 14 in the moving direction is generated, and applied to the driver 38b. Therefore, the tracking actuator control voltage in response to the acceleration pulse of this first predetermined level is applied to the tracking actuator 16.

In contrary, if the track pitch is dense as shown in FIG. 3(C), the moving velocity of the objective lens 14 becomes fast, and therefore, the kick pulse (deceleration pulse) of a second predetermined level to slightly decelerate the objective lens 14 in the moving direction is produced, and given to the driver 38b. Therefore, the tracking actuator control voltage corresponding to the deceleration pulse of this second predetermined level is applied to the tracking actuator 16.

Note that in this embodiment, as described above, the acceleration pulse of the first predetermined level and the deceleration pulse of the second predetermined level are set at a level and a width so as to absorb a track pitch deviation of at maximum ±5%, and have reverse polarities to each other.

Figure 4:
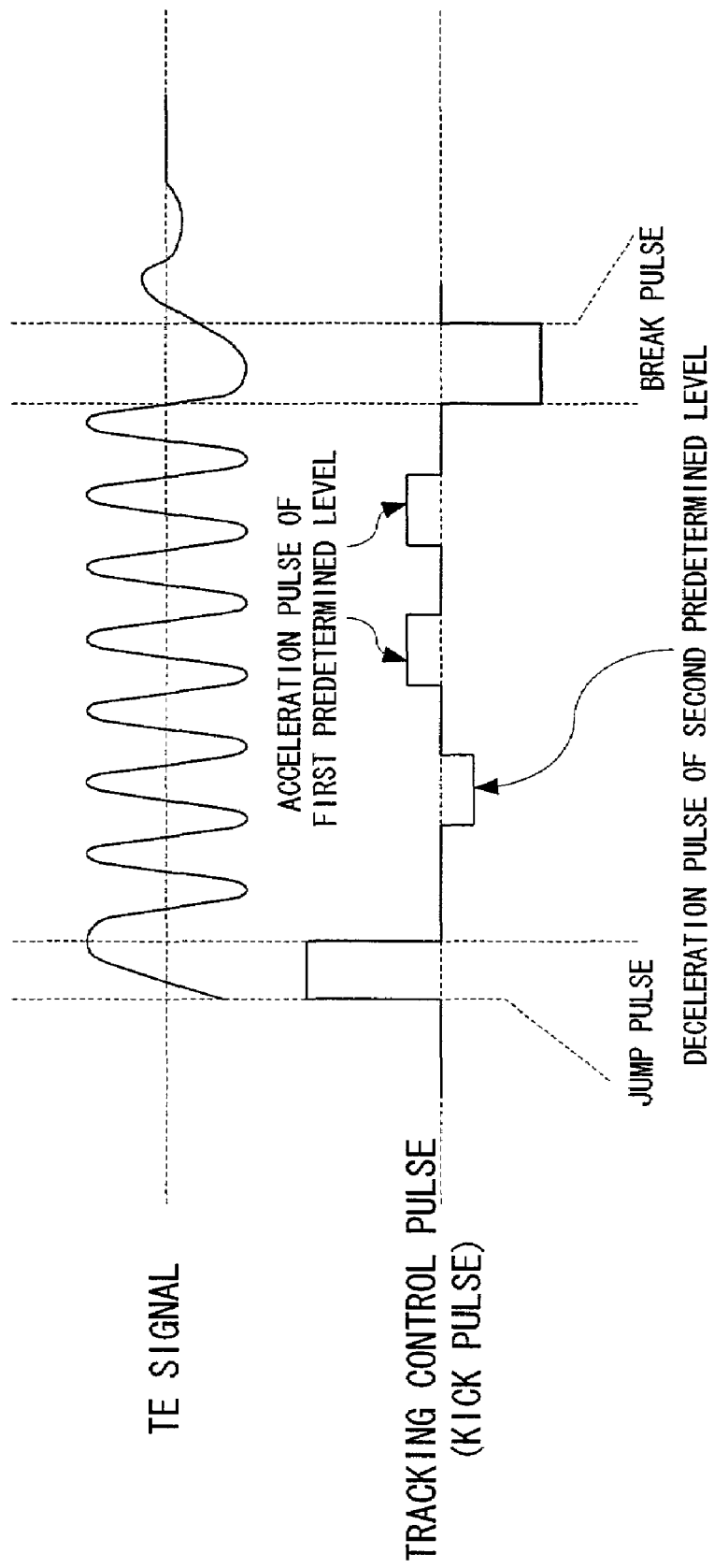
FIG. 4 is a waveform chart showing the TE signal and a tracking control pulse in a case of a track-jumping using a disk apparatus shown in FIG. 1 embodiment.

That is, as shown in FIG. 4, during an interval from a time that the jump pulse to jump the total track number is applied and to a time that the break pulse is applied, that is, an interval when the target track number has not been reached, a zero-cross cycle of an immediately preceding tracking error signal is detected. If the detected zero-cross cycle is delayed than a target cycle, the acceleration pulse of the first predetermined level is applied to the driver 38b, and in contrary thereto, if faster than the target cycle, the deceleration pulse of the second predetermined level is applied to the driver 38b. Thus, the speed control (constant speed control) is carried out in such a manner that the objective lens 14 moves between the adjacent tracks 22a at a target value (at a constant time interval) by appropriately accelerating or decelerating toward the moving direction (jump direction).

However, in a case that the objective lens 14a traverses in a place where the track pitch is even more larger than a case described by using FIG. 3(B) (in this embodiment, more than +50%), that is, a place having a considerably large track pitch as shown in FIG. 10(A), the velocity of the disk 22 is faster than that of the pick-up 12, that is, the moving speed of the objective lens 14. In other words, the moving speed of the objective lens 14 with respect to the disk 22 becomes extremely slow. In such a case, it is not sufficient to applies the aforementioned acceleration pulse of the first predetermined level in order to obtain a sufficient acceleration, and the moving direction of the objective lens 14 against the disk 22 is reversed (inverted) at a point indicated by P as shown in FIG. 10(B). If a relative moving direction is thus inverted, it becomes impossible to control the pick-up 12, and the pick-up 12 may run out of control.

Figure 5:
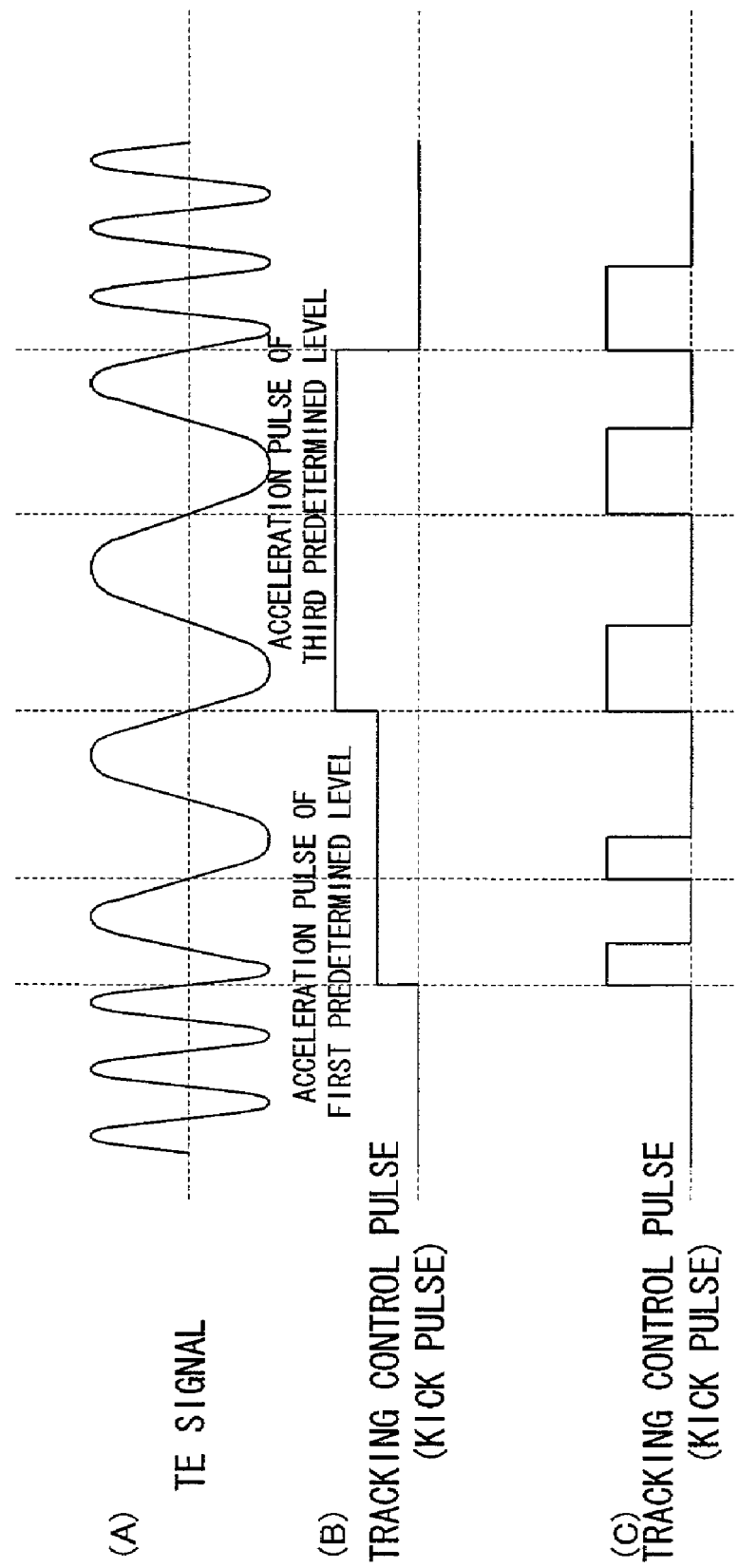
FIG. 5 is a waveform chart showing the TE signal and the tracking control pulse during a jumping in a case of the track-jumping using the disk apparatus shown in FIG. 1 embodiment.

To avoid this, in this embodiment, as shown in FIG. 5(A), if the DSP core 36a detects that the objective lens 14 moves between the adjacent tracks 22a in a considerably longer time than the constant time interval (in this embodiment, longer than 150 $\mu$sec), the DSP core 36a determines that the moving direction of the objective lens 14 to the disk 22 is beginning to invert, and generates the kick pulse (acceleration pulse) of a third predetermined level bigger than the first predetermined level as shown in FIG. 5(B) so as to greatly accelerate the objective lens 14 in the moving direction so that the relative moving direction is prevented from being inverted.

Note that in this embodiment, the third predetermined level is twice the level (magnitude) of the first predetermined level. However, in a case that the acceleration pulse of the first predetermined level is set at a constant width shorter than the zero-cross cycle as shown in FIG. 5(C), the acceleration pulse of the third predetermined level may have a pulse width two times (longer) while the a same level as the first predetermined level. Alternatively, it may be possible to generate an acceleration pulse of the third predetermined level by modifying both of the level and the width of the acceleration pulse of the first predetermined level. That is, it may be appropriate that a value obtained by integrating the acceleration pulse of the third predetermined level is twice a value obtained by integrating the acceleration pulse of the first predetermined level.

In contrast, it is conceivable that a pitch of the track 22a is even more smaller than that shown in FIG. 3(C). However, in this case, the moving direction of the objective lens 14 against the disk 22 is not to be inverted. Therefore it may be sufficient to slightly decelerate by applying the deceleration pulse of the second predetermined pulse described above.

Thus, if the objective lens 14 is caused to move toward a targeted track 22a (target track), and the objective lens 14 reaches ½ (half) track before the target track, the DSP core 36a applies the break pulse to the driver 38b to stop moving of the objective lens 14 in a radius direction (toward the inner periphery or the outer periphery of the disk 22).

In this embodiment, the break pulse is determined at such a level and in a width in advance to stop the objective lens 14 to move in the vicinity of the target track by putting a break a half track before the target track if the objective lens 14 controls to move between the adjacent tracks 22 in a constant time interval.

In addition, in this embodiment, levels and widths of the break pulse and the deceleration pulse of the second predetermined level are the same.

However, the polarities of such the jump pulse, the acceleration pulse, the deceleration pulse and the break pulse are determined according to a direction toward which the objective lens 14 moves (toward the inner periphery direction or the outer periphery direction), and the deceleration pulse and the break pulse are a reverse in polarity to the jump pulse and the acceleration pulse.

Furthermore, there is a possibility that the moving direction of the objective lens 14 with respect to the disk 22 becomes inverted if a vicinity of the target track to which the objective lens 14 intends to track-on is a place where the track pitch becomes considerably large (more than +50%, for example) due to an eccentricity of the disk 22 or a disturbance. That is, similar to a case of being jumped, the velocity of the disk 22 becomes faster than that of the pick-up 12, that is, the moving speed of the objective lens 14, and the moving direction of the objective lens 14 against the disk 22 becomes inverted so that the pick-up 12 runs out of control.

Figure 6:
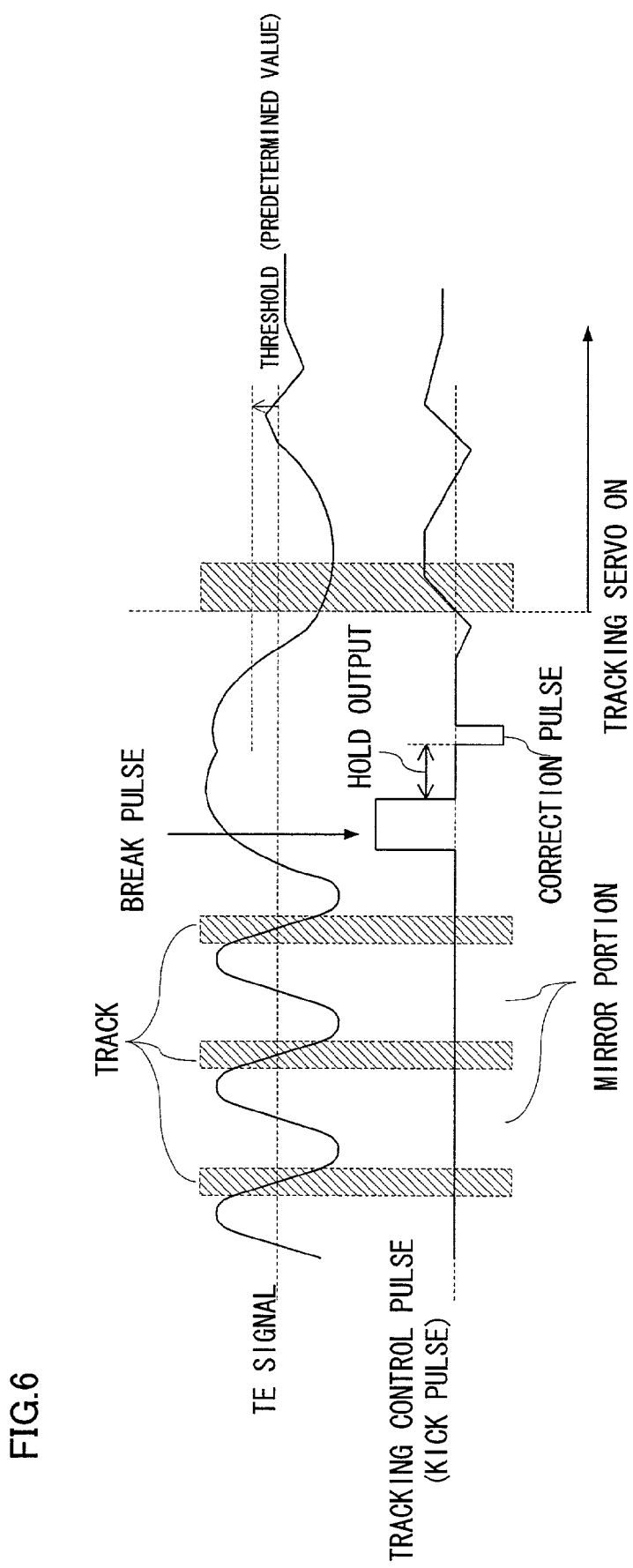
FIG. 6 is a waveform chart showing the TE signal and the tracking control pulse at a time of ending the track-jump in a case of the track-jumping using the disk apparatus of this embodiment.

To prevent this, in this embodiment, the DSP core 36a generates a kick pulse of 0 level (hold) after outputting the break pulse upon completion of jumping as shown in FIG. 6, and applies the same to the driver 38b, and detects a level of the TE signal only for a predetermined time period (in this embodiment, 60 $\mu$sec). Then, if the level of the TE signal is not equal to or less than a predetermined threshold value (predetermined value), it is determined that that the relative moving direction is beginning to invert, and a kick pulse (correction pulse) to correct the moving direction is generated, and applied to the driver 38b. The correction pulse is reverse in polarity to the break pulse, and set in advance at a constant level and a constant width.

Thus, it prevents the moving direction to invert even at the end of the jumping so that the pick-up 12 (objective lens 14) can track-on to the target track.

Note that the predetermined time period may be set at a time shorter than the zero-cross cycle. Since the target value of the zero-cross cycle is set at 100 $\mu$sec in this embodiment, the predetermined time period is set at a time shorter that 100 $\mu$sec, that is, 60 $\mu$sec.

Figure 7:
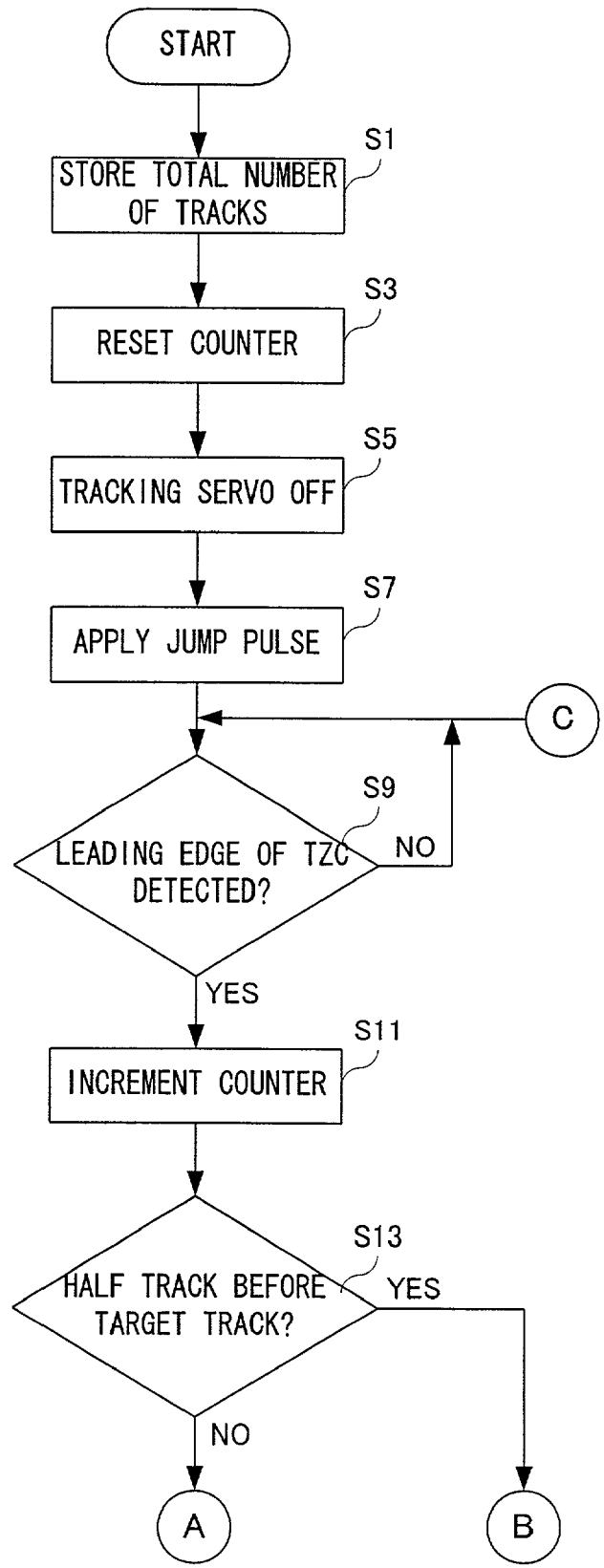
FIG. 7 is a flowchart showing a portion of a track-jump process of a DSP core shown in FIG. 1 embodiment.
Figure 8:
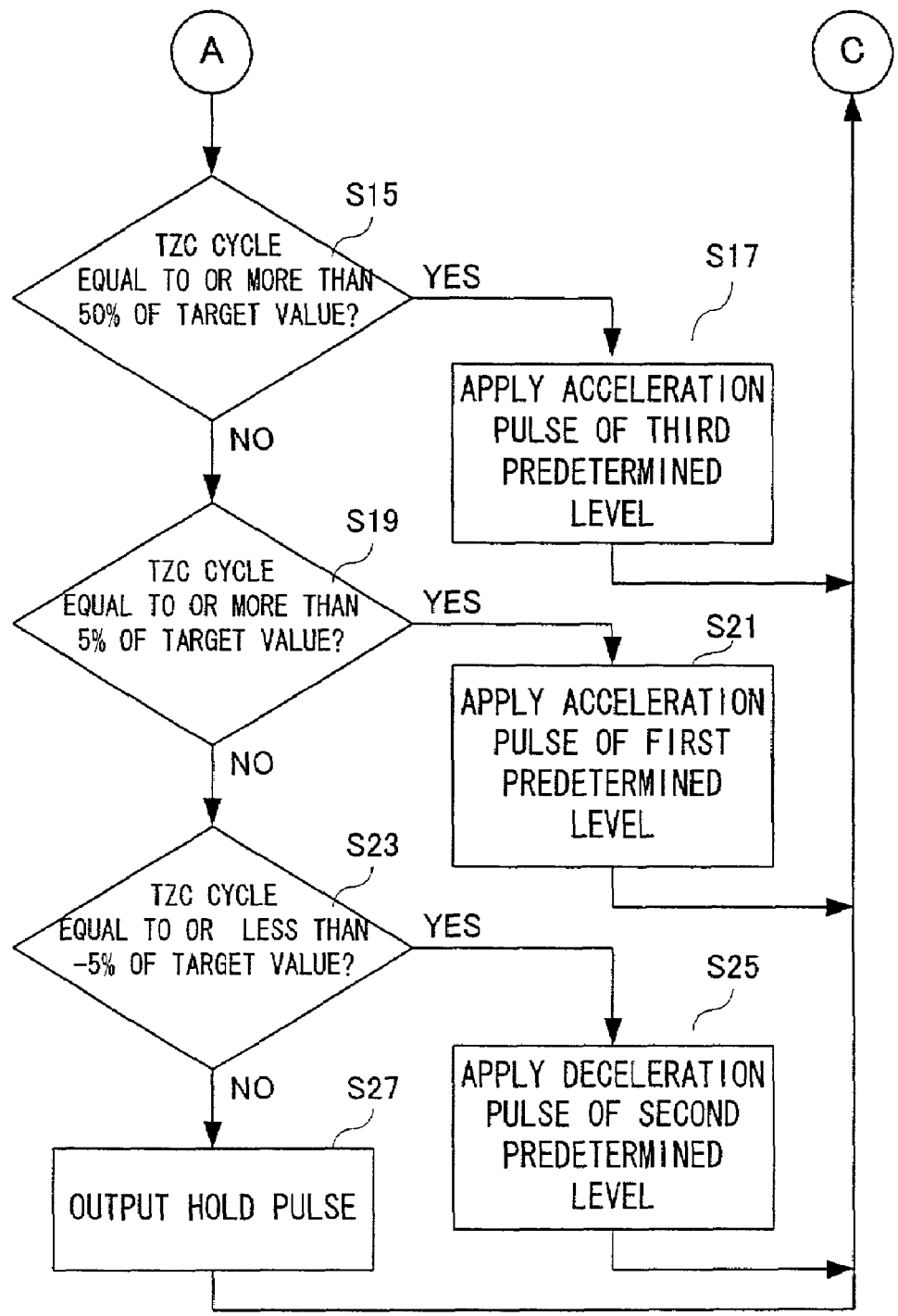
FIG. 8 is a flowchart showing another portion of the track-jump process of the DSP core shown in FIG. 1 embodiment.
Figure 9:
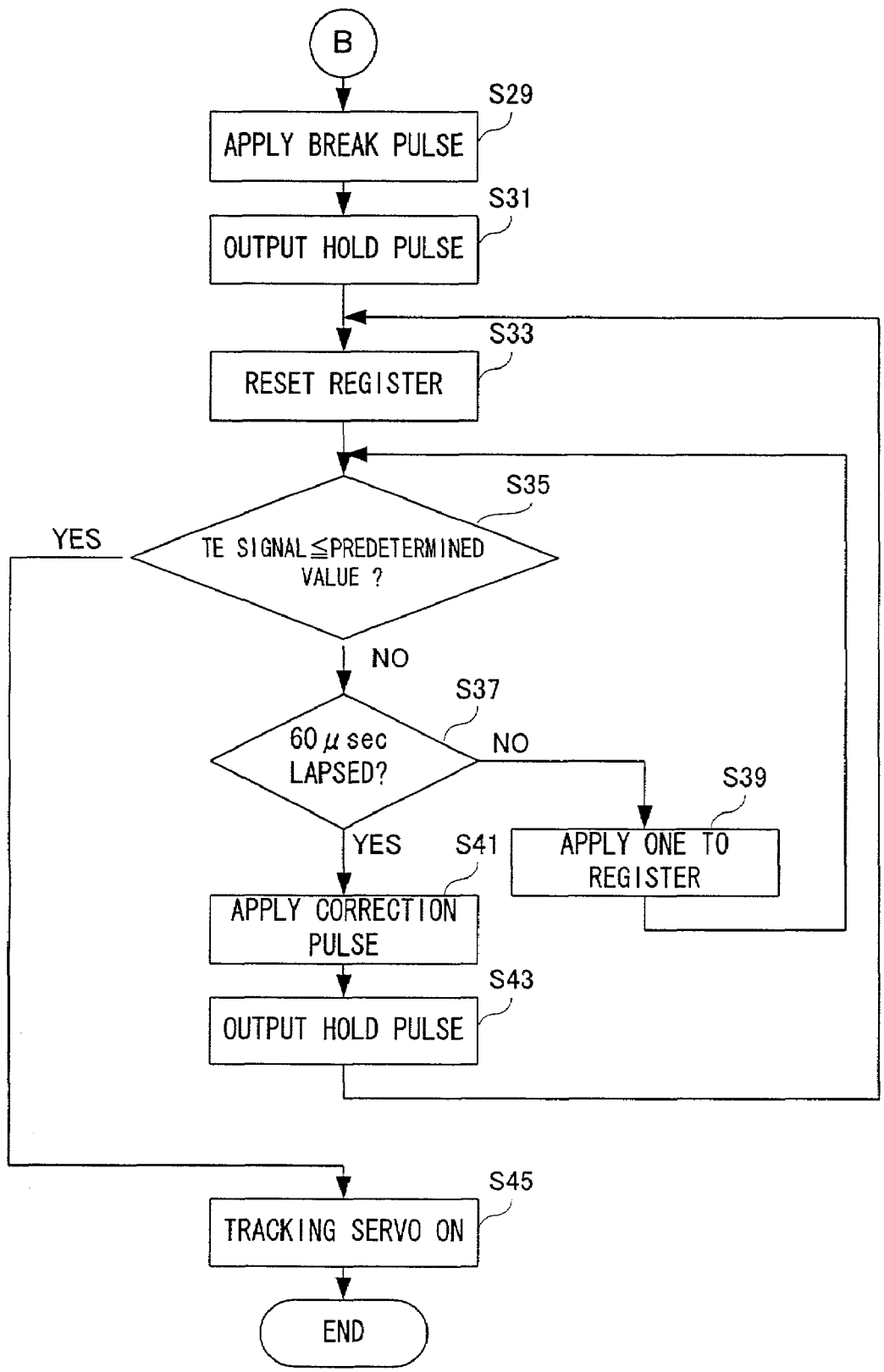
FIG. 9 is a flowchart showing still another portion of the track-jump process of the DSP core shown in FIG. 1 embodiment.

The DSP core 36a carries out such the operations according to flowcharts shown in FIG. 7 to FIG. 9. If an instruction to jump and a total number of the tracks are applied from the MCU 44, the DSP 36a starts to carry out a track-jump processing as described above, and the total number of tracks are stored in the memory 36b in a step S1 shown in FIG. 7.

In a succeeding step S3, the counter 36c provided in the same DSP 36 is reset. Then, the tracking servo is turned off (disabled) in a step S5. More specifically, only an output signal from the TE signal detecting circuit 32 is detected, and no tracking actuator control voltage is generated on the basis of the detected TE signal. That is, it is arranged that the objective lens 14 does not draw a track 22a.

Next, a jump pulse for jumping the total number of tracks stored in the memory 36b is generated, and the jump pulse is applied to the driver 38b in a step S7. Therefore, a tracking actuator control voltage corresponding to the jump pulse is applied to the tracking actuator 16, and the objective lens 14 is caused to move toward a desired (target) track.

The DSP 36 generates the aforementioned TZC signal on the basis of an output from the A/D converter 34b while the objective lens 14 is being moving. Then, if a leading edge of the TZC signal is detected in a step S9, the counter 36c is incremented in a step S11. On the other hand, if the leading edge of the TZC signal is not detected, the process directly returns to the same steps S9. Thus, the number of tacks 22a to have jumped (the number of tracks) is counted by using the counter 36c.

In a succeeding step S13, it is determined whether or not the current track is a half track before the target track. Herein, in a case of jumping from the track 22a (start track) which has been traced by the pick-up 12 (objective lens 14) traces immediately before the jumping to the target track as shown in FIG. 2(C), the total number of tracks to be jumped and the number of leading edges of the TZC signal being counted are coincident to each other. In addition, when the total number of tracks and the count value are coincident to each other, the objective lens 14 has reached a mirror portion 22b before the target track, that is, a half track before. Therefore, the DSP core 36 compares the total number of tracks stored in the memory 36b and the count value on the counter 36c to determine whether or not the count value of the counter 36c is coincident with the total number of tracks.

If "NO" is determined in the step S13, that is, if the count value of the counter 36c is not coincident with the total number of tracks, it is determined whether or not a cycle of the TZC signal (zero-cross signal) is equal to or more than +50% with respect to the target value (100 μsec) in a step S15 shown in FIG. 8, determining not reaching a half track before the target track. That is, the objective lens 14 is caused to move in such a manner as to detect the leading edge of the TZC signal at every 100 μsec, and it is determined whether or not the detected (immediately preceding) zero-cross cycle is equal to or more than a predetermined threshold value (150 μsec).

Note that the DSP core 36a resets and starts a timer which is not shown at a leading edge of the TZC signal so that the zero-cross cycle is measured every time one track is jumped.

If "YES" is determined in the step S15, that is, the zero-cross cycle is equal to or more than +50% of the target value, it is determined that the moving of the objective lens 14 is beginning to lag toward the disk 22 (track 22a), that is, an inversion of a relative direction is about to occur, and therefore, an acceleration pulse of the third predetermined level is generated in a step S17, and the process returns to the step S9 shown in FIG. 7 after applying the acceleration pulse to the driver 38b.

Note that the tracking actuator control voltage in response to the acceleration pulse of the third predetermined level is applied from the driver 38b to the tracking actuator 16, therefore, the objective lens 14 is greatly accelerated in the moving direction. Therefore, it is possible to forestall a reversed rotation of the relative direction as shown in FIG. 5(B).

On the other hand, if "NO" is determined in the step S15, that is, the zero-cross cycle is less than +50% of the target value, it is determines whether or not the zero-cross cycle is equal to or more than +5% of the target value (150 μsec) in a step S19. If "YES" is determined in the step S19, that is, the zero-cross cycle is equal to or more than +5% of the target value, an acceleration pulse of a first predetermined level which is smaller than the third predetermined level is generated in a step S21, and the process returns to the step S9 after applying this acceleration pulse to the driver 38b.

Note that the tracking actuator voltage according to the acceleration pulse of the first predetermined level is applied from the driver 38b to the tracking actuator 16, and therefore, the objective lens 14 is slightly accelerated in the moving direction.

On the other hand, if "NO" is determined in the step S19, that is, the zero-cross cycle is less than +5% of the target value, it is determined whether or not the zero-cross cycle is equal to or less than −5% (95 μsec) of the target value in a step S23. If "YES" is determined in the step S23, that is, the zero-cross cycle is equal to or more than −5% of the target value, a deceleration pulse of a second predetermined level is generated in a step S25, and the process return to the step S9 after applying the deceleration pulse to the driver 38b.

Note that the tracking actuator voltage in correspondence to the deceleration pulse of the second predetermined level is applied from the driver 38b to the tracking actuator 16, and thus, the objective lens 14 is slightly decelerated in the moving direction.

On the other hand, if "NO" is determined in the step S23, that is, the zero-cross cycle is less than −5% of the target value, a kick pulse of 0 level (hold) is produced in a step S27, and the process returns to the step S9 after applying the kick pulse to the driver 38b, that is, outputting tracking actuator control voltage of 0 V.

Furthermore, if "YES" is determined in the step S13 shown in FIG. 7, that is, the count value of the counter 36c is coincident with the total number of tracks, it is determined that the objective lens 14 reaches a half track before the target track. Then, a break pulse is generated in a step S29 shown in FIG. 9, and applied to the driver 38b. Therefore, a tracking actuator control voltage according to the break pulse is applied from the driver 38b to the tracking actuator 16, and therefore, the objective lens 14 is stopped to move. In a succeeding step S31, the hold pulse is applied to the driver 38b. That is, the tracking actuator control voltage of 0V is output.

Furthermore, a register 36d provided in the DSP 36 is reset in a step S33, and it is determined whether or not a level of the TE signal is equal to or less than a predetermined value in a step S35. If "YES" is determined in the step S35, that is, if the level of the TE signal is equal to or less than the predetermined value, the process is finished after turning on (enabling) a tracking servo in a step S45.

Note that when the tracking servo is turned on, the objective lens 14 draws the track on the basis of the TE signal, and tracks-on to the target track.

On the other hand, if "NO" is determined in the step S35, that is, if the level of the TE signal is equal to or more than the predetermined value, it is determined whether or not a predetermined time (60 μsec) has been lapsed by referring to a value of the register 36d in a step S37. If "NO" is determined in the step S37, that is, if 60 μsec has not been lapsed, the process returns to the step S35 after adding one (1) to the register 36d in a step S39.

That is, in this embodiment, whether or not the level of the TE signal is equal to or less than the predetermined value is detected by an interruption of every 1 μsec, and it is determined whether or not 60 μsec has been lapsed by counting a time using the register 36d.

On the other hand, if "YES" is determined in the step S37, that is, if 60 μsec has been lapsed in a state where the level of the TE signal is equal to or more than the predetermined value, it is determined that the moving direction of the objective lens 14 with respect to the disk 22 is beginning to invert, a correction pulse is generated in a step S41 to be applied to the driver 38b. Therefore, a tracking actuator control voltage equal to the correction pulse is applied from the driver 38b to the tracking actuator 16, and therefore, the objective lens 14 is slightly accelerated in the moving direction at a time of jumping. Subsequently, the hold pulse is output in a step S43, and then the process returns to the step S35.

That is, if the level of the TE signal does not become smaller than the predetermined value after outputting the correction pulse, the correction pulse is to be output once again.

According to this embodiment, during a seeking (jumping), the zero-cross cycle of the TE signal is detected, and the objective lens is greatly accelerated when the zero-cross cycle exceeds a predetermined threshold value so that the moving direction of the objective lens is not to invert against the disk. That is, it is possible to correctly track-on the target track because the number of tracks is not erroneously counted. Therefore, it is possible to start a reproduction with a short time.

Note that in this embodiment, the kick pulse generated by the DSP 36, that is, the jump pulse, the acceleration pulse, the deceleration pulse, the break pulse, the hold pulse, and the correction pulse are applied to the driver 38b, and the tracking control voltage based on each kick pulse is applied to the tracking actuator 16. However, given a possibility that an offset occurs to the tracking actuator due to a camming of the disk 22, and etc., it may be possible to correct the tracking actuator control voltage by an offset voltage, and apply the same to the tracking actuator 18. The offset voltage is a focus actuator control voltage immediately before the track jump, and thus easily obtained.

In addition, in this embodiment, if the level of the TE signal does not become equal to or less than the predetermined value after outputting the correction pulse, the correction pulse is once again output. However, it may be possible to raise a level of the correction pulse, widen a width of the correction pulse, and change the both if the level of the TE signal is detected in during outputting the correction pulse, and the level of the TE signal does not become equal to or less than the predetermined value.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A track jump control apparatus, comprising:
   a tracking error signal detector outputting a tracking error signal;
   a comparator for determining whether or not a zero-cross cycle of an immediately preceding tracking error signal exceeds a predetermined threshold value until a target track number is reached; and
   a tracking actuator driver for driving a pick-up in a track traversing direction at a time of track-jumping, and outputting a plurality of pulses including,
   a first acceleration pulse applied with a suitable timing, and
   a second acceleration pulse larger than said first acceleration pulse when it is determined by the comparator that said predetermined threshold value is exceeded.

2. An apparatus according to claim 1, wherein said second acceleration pulse is set in such a manner that at least one of a level and a width thereof is larger than that of said first acceleration pulse.

3. A track jump method in a track jump control apparatus in which a target track number is set and a jump pulse corresponding to said target tack number is applied to a tracking actuator driver, and by applying a first acceleration pulse with a suitable timing to said tracking actuator driver until said target track number is reached, comprising following steps of:
   (a) determining whether or not a zero-cross cycle of an immediately preceding tracking error signal exceeds a predetermined threshold value until said target track number is reached; and
   (b) applying a second acceleration pulse larger than said first acceleration pulse when said zero-cross cycle exceeds said predetermined threshold value.

4. A method according to claim 3, wherein said second acceleration pulse is set in such a manner that at least one of a level and a width thereof is larger than that of said first acceleration pulse.

5. A track jump control apparatus, comprising:
   (a) a tracking error signal detector outputting a tracking error signal;
   a comparator for determining whether or not a zero-cross cycle of an immediately preceding tracking error signal exceeds a predetermined threshold value until a target track number is reached;
   (b) a level detector for detecting a tracking error signal level;
   (c) a tracking actuator driver for driving a pick-up in a track traversing direction at a time of track-jumping, and outputting a plurality of pulses including,
   (1) a first acceleration pulse applied with a suitable timing,
   (2) a second acceleration pulse larger than the first acceleration pulse when it is determined by the comparator that said predetermined threshold value is exceeded,
   (3) a brake pulse applied a predetermined number of tracks before said target track, wherein said level detector detects the level of the tracking error signal within a predetermined period shorter than a target value of the zero-cross cycle at a time that the application of said brake pulse has ended, and
   (4) a third acceleration pulse when said level does not fall below a predetermined value.

6. A track jump method, comprising steps of:
   (a) setting a total track number up to a target track;
   (b) applying at a suitable timing a first acceleration pulse or a deceleration pulse to said tracking actuator driver;
   (c) determining whether or not a zero-cross cycle of an immediately preceding tracking error signal exceeds a predetermined threshold value until the target track is reached;
   (d) applying a second acceleration pulse, at least one of a level and a width of which is larger than at least corresponding one of a level and a width of said first acceleration pulse, to said tracking actuator driver when it is determined by said step (c) that said predetermined threshold value is exceeded;
   (e) applying a brake pulse to said tracking actuator driver a predetermined number of tracks before said target track;
   (f) detecting a level of the tracking error signal within a predetermined period shorter than a target value of the zero-cross cycle at a time that the application of said brake pulse by said step (e) is ended; and
   (g) applying a third acceleration pulse to said tracking actuator driver when said level does not fall below a predetermined value.

7. An apparatus according to claim 1, wherein the plurality of pulses further includes a jump pulse which initiates the movement of an objective lens.

8. An apparatus according to claim 1, wherein the plurality of pulses further includes a brake pulse which stops the movement of an objective lens.

* * * * *